(12) United States Patent
Booth

(10) Patent No.: US 9,379,583 B2
(45) Date of Patent: Jun. 28, 2016

(54) MAGNET ASSEMBLY

(75) Inventor: James Kenneth Booth, Brande (DK)

(73) Assignee: SIEMENS AKTIENGESELLSCHAFT, München (DE)

( * ) Notice: Subject to any disclaimer, the term of this patent is extended or adjusted under 35 U.S.C. 154(b) by 1029 days.

(21) Appl. No.: 13/008,093

(22) Filed: Jan. 18, 2011

(65) Prior Publication Data

US 2011/0175364 A1 Jul. 21, 2011

(30) Foreign Application Priority Data

Jan. 20, 2010 (EP) .................................... 10000542

(51) Int. Cl.
*H02K 1/22* (2006.01)
*H02K 1/27* (2006.01)
*H01F 7/02* (2006.01)
*H02K 7/18* (2006.01)

(52) U.S. Cl.
CPC .............. *H02K 1/278* (2013.01); *H02K 1/2786* (2013.01); *H01F 7/0221* (2013.01); *H02K 7/1838* (2013.01); *H02K 2213/12* (2013.01); *Y02E 10/721* (2013.01); *Y02E 10/725* (2013.01)

(58) Field of Classification Search
CPC .... H02K 1/278; H02K 1/2773; H02K 1/2786
USPC ............. 310/156.08, 156.12–156.15, 156.19, 310/156.21, 156.23, 156.31, 156.38, 310/156.48, 156.49, 156.59, 156.83, 310/154.03, 154.13
See application file for complete search history.

(56) References Cited

U.S. PATENT DOCUMENTS

| | | | | |
|---|---|---|---|---|
| 4,445,062 A * | 4/1984 | Glaser | ...................... | 310/156.59 |
| 4,954,736 A * | 9/1990 | Kawamoto et al. | ...... | 310/156.21 |
| 5,063,318 A * | 11/1991 | Anderson | ................ | 310/156.19 |
| 7,701,100 B2 * | 4/2010 | Morel | ...................... | 310/156.19 |
| 8,018,110 B2 * | 9/2011 | Alexander et al. | ........ | 310/156.56 |

FOREIGN PATENT DOCUMENTS

| | | |
|---|---|---|
| DE | 19751710 A1 | 5/1999 |
| DE | 102004058451 A1 | 6/2006 |
| EP | 2017859 A1 | 1/2009 |
| JP | 60102851 A | 6/1985 |
| JP | 200603402 A | 2/2006 |
| WO | WO 2007119952 A1 | 10/2007 |

\* cited by examiner

*Primary Examiner* — Dang Le

(57) ABSTRACT

A magnet assembly is disclosed. The magnet assembly includes a base element and a magnet attached to a first surface of the base element. A second surface of the base element opposite to the first surface of the base element includes a contour, which is adapted to engage with a complementary contour of a support structure of a rotor arrangement. It is further described a method for engaging a magnet assembly to a support structure of a rotor arrangement, a rotor arrangement for an electromechanical transducer, an electromechanical transducer and a wind turbine.

10 Claims, 4 Drawing Sheets

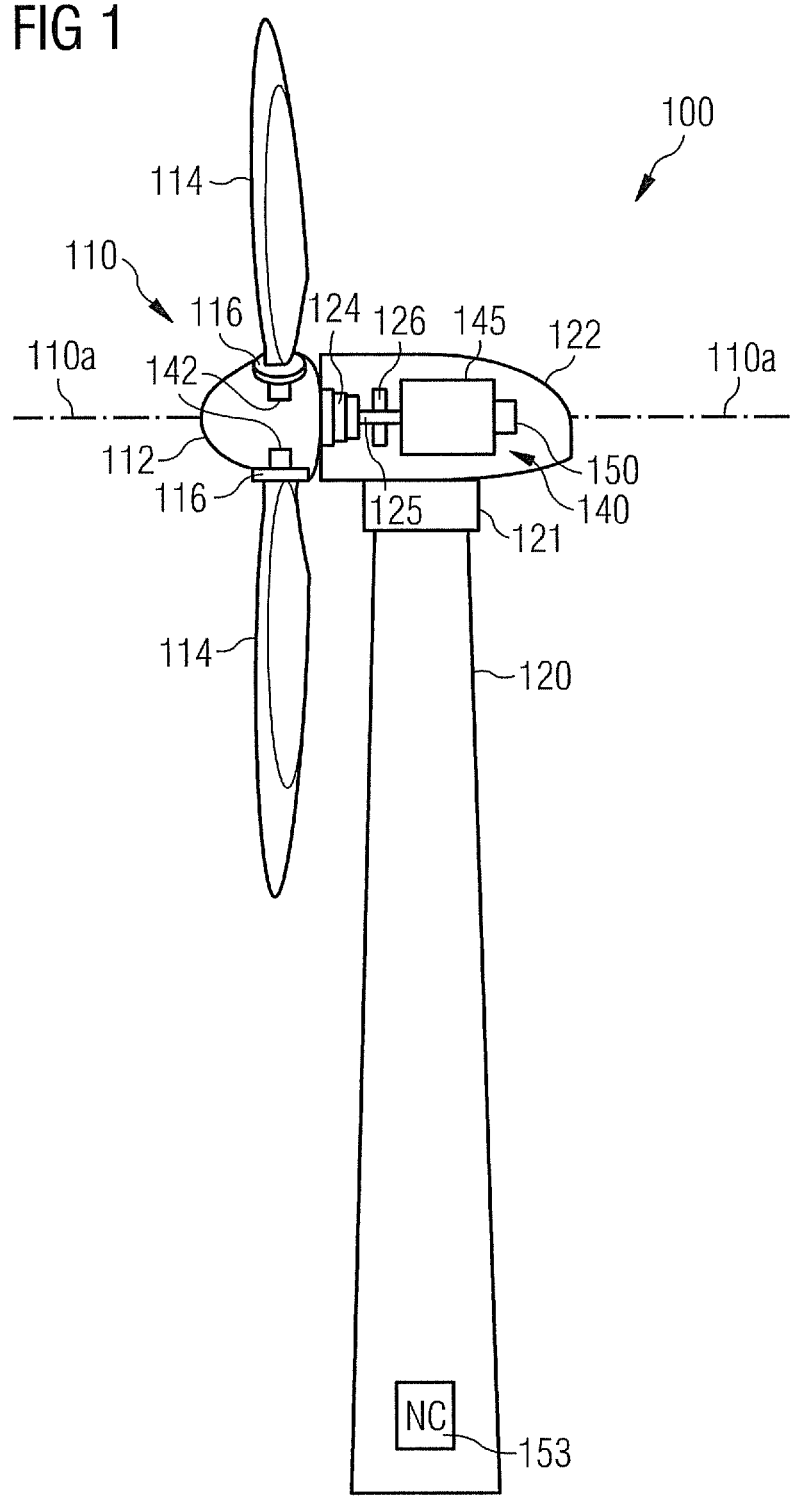

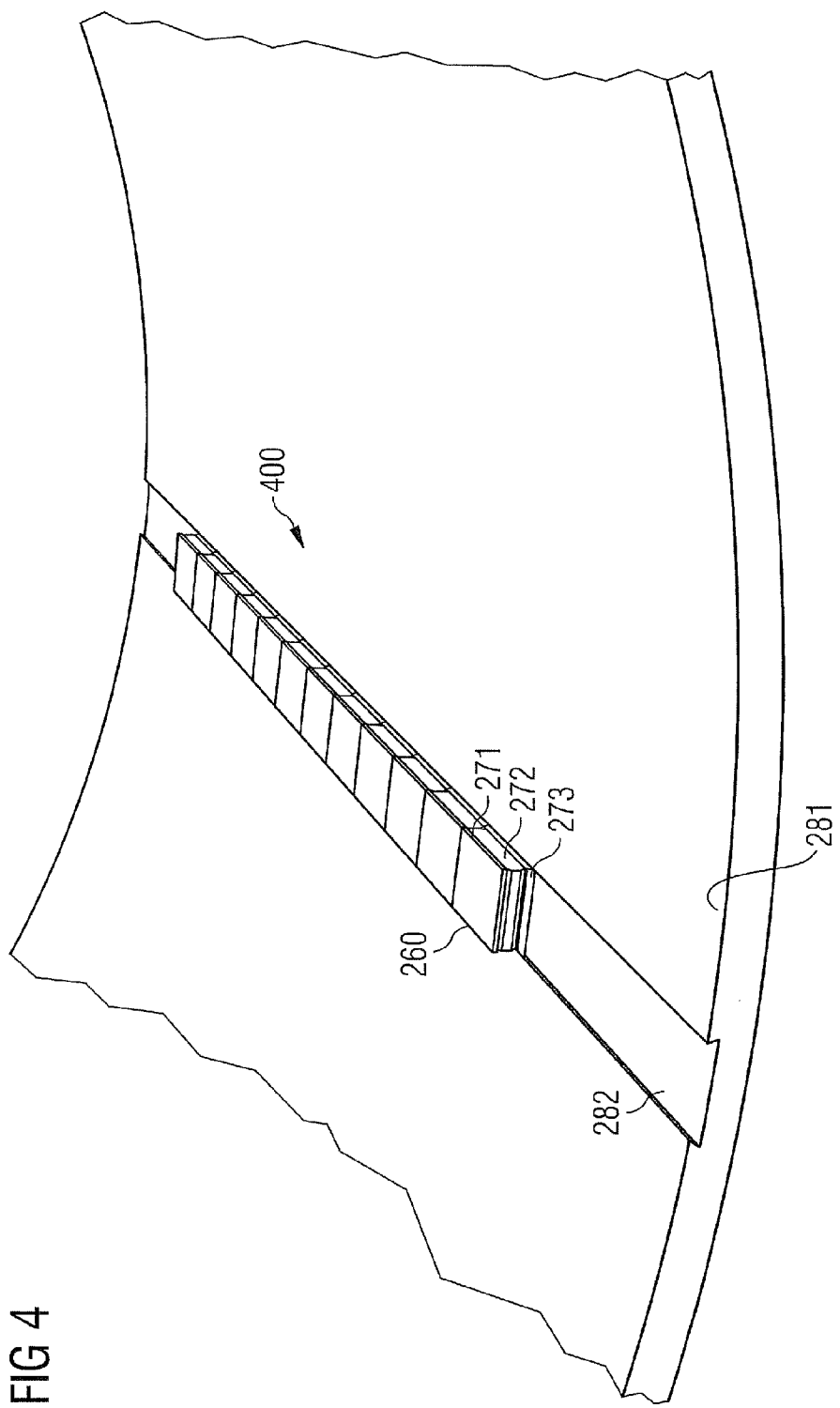

MAGNET ASSEMBLY

CROSS REFERENCE TO RELATED APPLICATIONS

This application claims priority of European Patent Office application No. 10000542.0 EP filed Jan. 20, 2010, which is incorporated by reference herein in its entirety.

FIELD OF INVENTION

The present invention relates to the technical field of electromechanical transducers having a rotor which comprises magnets, in particular permanent magnets. In particular, the present invention relates to a magnet assembly for a rotor arrangement of an electromechanical transducer. Further, the present invention relates to a rotor arrangement, to an electromechanical transducer and to a wind turbine, which are all equipped with such a magnet assembly. Furthermore, the present invention relates to a method for engaging a magnet assembly with a support structure of a rotor.

ART BACKGROUND

Electromechanical transducers are machines, which convert electrical energy into mechanical energy or vice versa. An electric motor is a widely used electromechanical transducer that converts electrical energy into mechanical energy using magnetic field linkage. An electric generator is an electromechanical transducer that converts mechanical energy into electrical energy also using a magnetic field linkage.

An electromechanical transducer comprises a stator and a rotor. The stator is an assembly, which represents the stationary part of an electromechanical transducer. The rotor is an assembly, which represents the moving part of an electromechanical transducer.

In order to realize a magnetic field linkage, magnets, for instance permanent magnets, may be used in particular for a rotor of an electromechanical transducer. In recent years, especially since the introduction of rare-earth magnetic materials, permanent magnet (PM) electromechanical transducers have become popular since they eliminate the need for commutators and brushes, which are commonly used with conventional Direct Current (DC) electromechanical transducer. The absence of an external electrical rotor excitation eliminates losses on the rotor and makes permanent magnet electromechanical transducers more efficient. Further, the brushless design of a PM electromechanical transducer allows conductor coils to be located exclusively in the stationary stator. In this respect it is mentioned that non-PM electromechanical transducers, which are equipped with commutators and brushes, are susceptible to significantly higher maintenance costs.

PM electromechanical transducers are also known for their durability, controllability, and absence of electrical sparking. Thanks to their advantages the PM electromechanical transducers are widely used in many applications such as electric vehicles (electromechanical transducer is a motor) or in power generation systems (electromechanical transducer is a generator) such as for instance a wind turbine.

Strong permanent magnets, like rare-earth magnets, are used to an increasing extent in large electrical machines, especially in motors and generators. This is due to the increased efficiency and robustness compared to electrical excitation. But regarding practical applications some difficulties may occur. The materials, in particular of rare-earth magnets, may be rather brittle and cannot safely be fixed by bolting alone. The magnets may be fixed to a rotor rim for example by, for instance, gluing. Furthermore, it may be a difficult, time consuming and not least a hazardous process to handle the individual magnets and to get the correct position of each magnet as the magnets may be pulled towards other magnets and ferromagnetic objects in the production setup. Thus, the mounting and alignment of the permanent magnets at the rotor assembly are difficult and time consuming. Therefore, there may be a need for facilitating mounting and alignment of permanent magnets to a rotor assembly of an electromechanical transducer.

SUMMARY OF THE INVENTION

This need may be met by the subject matter according to the independent claims. Advantageous embodiments of the present invention are described by the dependent claims.

According to a first aspect of the invention there is provided a magnet assembly comprising a base element and a magnet attached to a first surface of the base element, wherein a second surface of the base element opposite to the first surface of the base element comprises a contour, which is adapted to engage with a complementary contour of a support structure of a rotor arrangement.

The described magnet assembly is based on the idea that, by using a contour and a complementary contour, each magnet may be pushed safely in place providing a great advantage in contrast to traditional mounting, where each magnet is installed without any guidance and where the magnet can be pulled to another object by magnetic force. Further, the magnet assembly may be more safely handled in production as the magnets that are used may be very strong and constitute a potential safety hazard if not handled correctly, but may be easily mounted as the contour arrangement may provide a secure guidance for the positioning of the magnets. The magnet assembly may provide a short time in production saving money. The use of one patron (one pole patron) comprising a number of magnets corresponding to one entire pole may provide easier and safer handling of the magnets during assembly of the rotor. The magnet assembly may further provide a possibility for automated or semi automated assembly of the rotor.

The base element may comprise a contour, which is adapted to engage with a complementary contour of the support structure. This may provide the advantage that the base element or mounting structure and the support structure can be mechanically connected to each other in a reliable manner without using any specific tools such as a screwdriver or a spanner.

Specifically, when manufacturing the rotor arrangement the magnet assembly may be inserted into a groove or put onto a protrusion of a central shaft of the rotor arrangement in a slidable manner, wherein the groove or the protrusion extend in the longitudinal axial direction of the central shaft.

The base element may be a base plate comprising a first side corresponding to the first surface of the base element and a second side corresponding to the second surface of the base element. This may provide the advantage that a permanent magnet, which usually has a planar surface, can be attached easily to the base element.

Further, by using a base plate the base element can have a flat design, such that the magnet assembly can be realized within a compact and in particular within a flat configuration. This may provide the advantage that when using the described magnet assembly the diameter of a corresponding rotor assembly will be only marginally larger than the diameter of a conventional rotor assembly.

According to a further embodiment of the invention, the contour and/or the complementary contour is formed in a dove tail manner. This may provide the advantage that the magnet assembly can be aligned correctly with the support structure. Further, a dove tail shape or any similar geometric form may ensure a mechanically reliable fastening of the magnet assembly with the support structure of the rotor arrangement.

According to a further embodiment of the invention, the support structure of the rotor arrangement comprises a protrusion and the base element comprises a recess for engaging with the protrusion of the support structure of the rotor arrangement. The base element may be shaped with a dovetail guide on the opposite side of where the magnet is attached. The dove-tail guide may be prepared to engage with a corresponding protrusion on the rotor support structure.

According to a further embodiment of the invention, the base element comprises a protrusion and the support structure of the rotor arrangement comprises a recess for engaging with the protrusion of the base element. In this case, the rotor support structure may comprise a dove tail guide that is prepared to engage with a corresponding part on the base element.

According to a further embodiment of the invention, the magnet is attached to the base element by a gluing material. The glue may be located at a boundary surface between the base element and the permanent magnet. This may mean that the fastening of the permanent magnet to the base element is realized by gluing.

In view of a typical large brittleness of magnetic materials attaching the permanent magnet to the base element may be preferable in particular over other fastening mechanisms such as using screws and/or bolts. By using an appropriate glue material the risk for damaging the permanent magnet when attaching the same to the base element may be kept very small.

According to a further embodiment of the invention, the magnet assembly further comprises a protective cover encapsulating the magnet. The magnet may consist of a material which corrodes very easily and needs a high degree of protection. Therefore, the magnet assembly may comprise a protective cover for encapsulating the magnet.

According to a further embodiment of the invention, the protective cover consists of a non-metallic material.

According to a further embodiment of the invention, the protective cover is fixed to the base element. The protective cover may be fixed to the base plate or element for instance by gluing, welding or soldering.

According to a further embodiment of the invention, the base element and/or the protective cover comprises an opening for evacuating an interior of the protective cover. The interior cavity between the protective cover and the base element may be evacuated through at least one opening in the base element or in the protective cover. In a further embodiment, two openings both located in the base element may be used, one opening to evacuate the interior cavity and the other opening to inject a filling mass. The magnets may less corrode and be mechanically protected inside a hermetically sealed protective cover filled with a suitable filling mass.

According to a further aspect of the invention there is provided a rotor arrangement for an electromechanical transducer. The provided rotor arrangement comprises a support structure and a magnet assembly as described above.

The described rotor assembly is based on the idea that by using the magnet assembly as described above each magnet may be pushed safely in place.

According to a further aspect of the invention there is provided an electromechanical transducer comprising a stator assembly and a rotor arrangement as described above.

The provided electromechanical transducer is based on the idea that with the above described rotor arrangement, using a contour and a complementary contour, each magnet may be pushed safely in place.

According to an embodiment of the invention the electromechanical transducer is a generator.

According to a further aspect of the invention there is provided a wind turbine for generating electrical power. The provided wind turbine comprises a tower, a rotor, which is arranged at a top portion of the tower and which comprises at least one blade, and an electromechanical transducer as described above, wherein the electromechanical transducer is mechanically coupled with the rotor.

According to a further aspect of the invention there is provided a method for engaging a magnet assembly to a support structure of a rotor, wherein the magnet assembly comprises a base element and a magnet attached to a first surface of the base element. The provided method comprises engaging a contour of a second surface of the base element opposite to the first surface of the base element with a complementary contour of a support structure of a rotor arrangement.

Also the described engaging method is based on the idea that by using the magnet assembly as described above each magnet may be pushed safely in place providing a great advantage in contrast to traditional mounting, where each magnet is installed without any guidance and where the magnet can be pulled to another object by magnetic force. Further, by using the described method, the magnet assembly may be more safely handled in production as the magnets that are used may be very strong and constitute a potential safety hazard if not handled correctly, but may be easily mounted as the contour arrangement may provide a secure guidance for the positioning of the magnets.

It has to be noted that embodiments of the invention have been described with reference to different subject matters. In particular, some embodiments have been described with reference to apparatus type claims whereas other embodiments have been described with reference to method type claims. However, a person skilled in the art will gather from the above and the following description that, unless other notified, in addition to any combination of features belonging to one type of subject matter also any combination between features relating to different subject matters, in particular between features of the apparatus type claims and features of the method type claims is considered as to be disclosed with this document.

The aspects defined above and further aspects of the present invention are apparent from the examples of embodiment to be described hereinafter and are explained with reference to the examples of embodiment. The invention will be described in more detail hereinafter with reference to examples of embodiment but to which the invention is not limited.

BRIEF DESCRIPTION OF THE DRAWINGS

FIG. 1 shows a wind turbine according to an embodiment of the present invention.

FIG. 4 shows in a perspective view a row of magnet assemblies engaged with the support structure of the rotor assembly shown in FIG. 1.

DETAILED DESCRIPTION

Figure 2A:
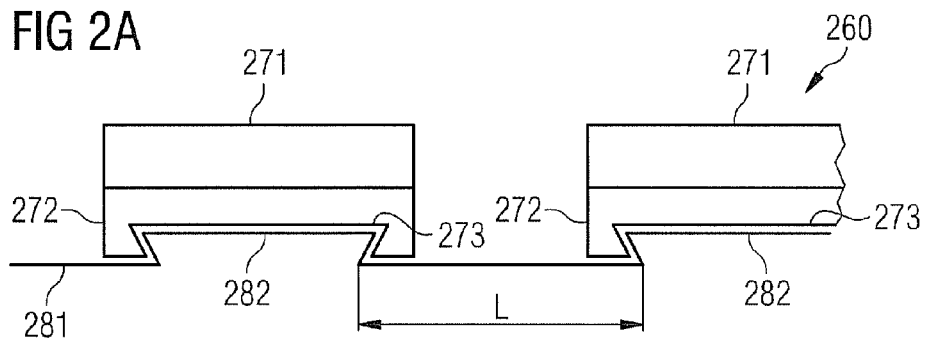
FIG. 2*a* shows in a cross sectional view two magnet assemblies, which are engaged in a dove tail arrangement with the support structure of the rotor assembly shown in FIG. 1.

The illustration in the drawing is schematically. It is noted that in different figures, similar or identical elements are provided with the same reference signs.

FIG. 1 shows a wind turbine 100 according to an embodiment of the invention. The wind turbine 100 comprises a tower 120, which is mounted on a non-depicted fundament. On top of the tower 120 there is arranged a nacelle 122. In between the tower 120 and the nacelle 122 there is provided a yaw angle adjustment device 121, which is capable of rotating the nacelle 122 around a non depicted vertical axis, which is aligned with the longitudinal extension of the tower 120. By controlling the yaw angle adjustment device 121 in an appropriate manner it can be made sure, that during a normal operation of the wind turbine 100 the nacelle 122 is always properly aligned with the current wind direction. However, the yaw angle adjustment device 121 can also be used to adjust the yaw angle to a position, wherein the nacelle 122 is intentionally not perfectly aligned with the current wind direction.

The wind turbine 100 further comprises a rotor 110 having three blades 114. In the perspective of FIG. 1 only two blades 114 are visible. The rotor 110 is rotatable around a rotational axis 110a. The blades 114, which are mounted at a hub 112, extend radially with respect to the rotational axis 110a.

In between the hub 112 and a blade 114 there is respectively provided a blade adjustment device 116 in order to adjust the blade pitch angle of each blade 114 by rotating the respective blade 114 around a non depicted axis being aligned substantially parallel with the longitudinal extension of the blade 114. By controlling the blade adjustment device 116 the blade pitch angle of the respective blade 114 can be adjusted in such a manner that at least when the wind is not so strong a maximum wind power can be retrieved from the available wind power. However, the blade pitch angle can also be intentionally adjusted to a position, in which only a reduced wind power can be captured.

As can be seen from FIG. 1, within the nacelle 122 there is provided a gear box 124. The gear box 124 is used to convert the number of revolutions of the rotor 110 into a higher number of revolutions of a shaft 125, which is coupled in a known manner to an electromechanical transducer 140. The electromechanical transducer is a generator 140.

Further, a brake 126 is provided in order to stop the operation of the wind turbine 100 or to reduce the rotational speed of the rotor 110 for instance (a) in case of an emergency, (b) in case of too strong wind conditions, which might harm the wind turbine 100, and/or (c) in case of an intentional saving of the consumed fatigue life time and/or the fatigue life time consumption rate of at least one structural component of the wind turbine 100.

The wind turbine 100 further comprises a control system 153 for operating the wind turbine 100 in a highly efficient manner. Apart from controlling for instance the yaw angle adjustment device 121 the depicted control system 153 is also used for adjusting the blade pitch angle of the rotor blades 114 in an optimized manner.

In accordance with basic principles of electrical engineering, the generator 140 comprises a stator assembly 145 and a rotor arrangement 150. The stator assembly 145 comprises a plurality of coils for generating electrical current in response to a time alternating magnetic flux. The rotor arrangement comprises a plurality of permanent magnets, which are arranged in rows being aligned with a longitudinal axis of the rotor arrangement 150. As will be described below in detail, the permanent magnets being assigned to one row are engaged with a support structure of the rotor arrangement, wherein a contour of a magnet assembly comprising the permanent magnets is adapted to engage with a complementary contour of the support structure.

FIG. 2a shows in a cross sectional view two magnet assemblies 280, which are engaged in a dove tail arrangement with the support structure 281 of the rotor assembly shown in FIG. 1. The magnet assemblies comprise a base element 272 and a permanent magnet 271 being positioned on the base element. The base element 272 comprises a recess or groove 273 as contour. The support structure 281 of the rotor comprises a protrusion 282 as complementary contour. The distance between two protrusions is shown as length L.

Figure 2B:
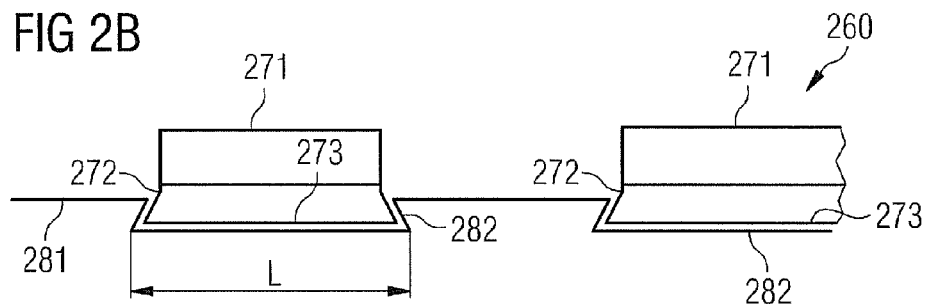
FIG. 2b shows in a cross sectional view two magnet assemblies, which are engaged in a dove tail arrangement, opposite as shown in FIG. 2a, with the support structure of the rotor assembly shown in FIG. 1.

FIG. 2b shows in a cross sectional view two magnet assemblies, which are engaged in a dove tail arrangement, opposite as shown in FIG. 2a, with the support structure of the rotor assembly shown in FIG. 1. FIG. 2b shows two magnet assemblies 280, which are engaged in a dove tail arrangement with the support structure 281 of the rotor assembly shown in FIG. 1. The magnet assemblies comprise a base element 272 and a permanent magnet 271 being positioned on the base element. The base element 272 comprises protrusion 273 as contour. The support structure 281 of the rotor comprises a recess or groove 282 as complementary contour. The length of one recess of the support structure is shown as length L.

FIG. 2a shows in a base element 272 with a first surface 274(a) and a second surface 274(b) opposite to the first surface 274(a). The first surface 274(a) adapted to attach to a magnet. The second surface 274(b) comprises a contour 273, which is adapted to engage with a complementary contour of a support structure of a rotor arrangement.

Figure 3:
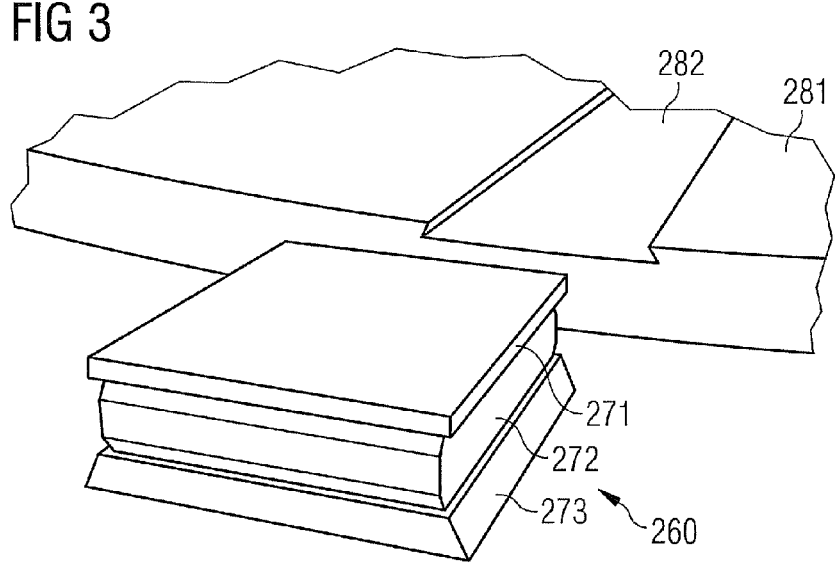
FIG. 3 shows in a perspective view the magnet assembly as shown in FIG. 2b.
Figure 2C:
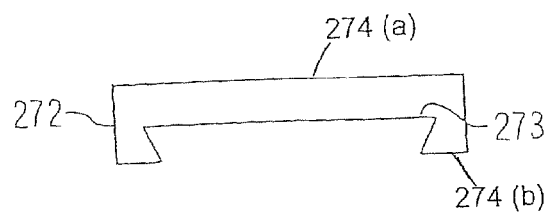
FIG. 2c shows a first and second surface of a base element.

FIG. 3 shows in a perspective view the magnet assembly 260 as shown in FIG. 2b. The support structure 281 of the rotor comprises a recess 282. The magnet assembly comprises a base element 272, 273 consisting of a plate part 272 and a protrusion part 273. A magnet or permanent magnet 271 is positioned on the plate part. The magnet assembly may be inserted into the recess of the support structure from one or two sides of the support structure as shown in FIG. 3 in a slidable manner, wherein the recess or groove extend in the longitudinal axial direction of the central shaft of the rotor arrangement. This embodiment may also be implemented vice versa, that means the magnet assembly comprising a recess and the support structure comprising a protrusion.

FIG. 4 shows in a perspective view a row of magnet assemblies 400 engaged with the support structure of the rotor assembly shown in FIG. 1. The row of magnet assemblies comprises a plurality of magnet assemblies. Each magnet assembly 260 comprises a base element comprising a plate part 272 and a protrusion part 273. A magnet 271 is positioned on the plate part 272. Each magnet assembly 260 is inserted by sliding into a recess or groove 282 of the support structure

281. The recess and the protrusion may also be arranged vice versa, that means the magnet assemblies comprising the recess and the support structure comprising the protrusion.

Figure 5:
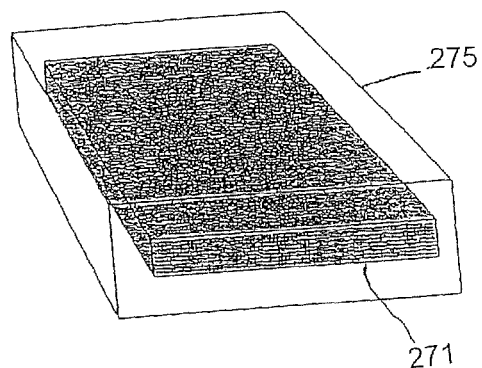
FIG. 5 shows a magnet being encapsulated.

FIG. 5 shows a magnet 271 which is encapsulated by a protective cover 275 in order to protect the magnet 271. The protective cover 275 may consist of a non-metallic material.

Figure 6:
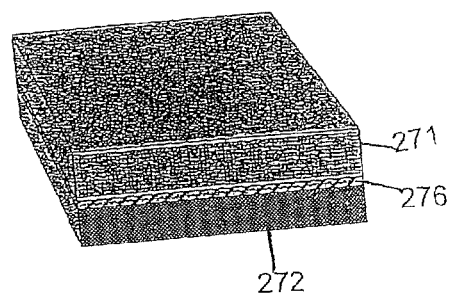
FIG. 6 shows a magnet attached to the base element by a gluing material.

FIG. 6 shows a magnet 271 which is attached to the base element 272 by a gluing material 276.

The protrusion 273 is adapted to engage with the complementary contour of the support structure, i.e. with the recess 282. This provides the advantage that the base element 272, 273 and therefore the magnet assembly 260 and the support structure 281 can be mechanically connected to each other in a reliable manner without using any specific tools such as a screwdriver or a spanner.

Specifically, when manufacturing the rotor arrangement the magnet assembly may be inserted into the groove or put onto a protrusion of a central shaft of the rotor arrangement in a slidable manner, wherein the groove or the protrusion extend in the longitudinal axial direction of the central shaft.

By using a contour (for instance a protrusion) and a complementary contour (for instance a recess), each magnet may be pushed safely in place providing a great advantage in contrast to traditional mounting, where each magnet is installed without any guidance and where the magnet can be pulled to another object by magnetic force. Further, the magnet assembly may be more safely handled in production as the magnets that are used may be very strong and constitute a potential safety hazard if not handled correctly, but may be easily mounted as the contour arrangement, for instance a dove tail arrangement, may provide a secure guidance for the positioning of the magnets as shown for example in FIG. 4.

It should be noted that the term "comprising" does not exclude other elements or steps and "a" or "an" does not exclude a plurality. Also elements described in association with different embodiments may be combined. It should also be noted that reference signs in the claims should not be construed as limiting the scope of the claims.

The invention claimed is:

1. A magnet assembly, comprising:
   a base element that includes a first and second surface, the first surface on an opposite side of the base element from the second surface, the second surface includes a contour adapted to engage with a complementary contour of a support structure of a rotor arrangement;
   a magnet attached to the first surface of the base element; and
   a protective cover encapsulating the magnet, the protective cover consisting of a non-metallic material.

2. The magnet assembly as set forth in claim 1, wherein the contour and/or the complementary contour is formed in a dove tail manner.

3. The magnet assembly as set forth in claim 1, wherein the support structure of the rotor arrangement comprises a protrusion and wherein the base element comprises a recess for engaging with the protrusion of the support structure of the rotor arrangement.

4. The magnet assembly as set forth in claim 1, wherein the base element comprises a protrusion and wherein the support structure of the rotor arrangement comprises a recess for engaging with the protrusion of the base element.

5. The magnet assembly as set forth in claim 1, wherein the magnet is attached to the base element by a gluing material.

6. The magnet assembly as set forth in claim 1, the protective cover is fixed to the base element.

7. A rotor arrangement for an electromechanical transducer, the rotor arrangement comprising
   a support structure; and
   a magnet assembly as set forth in claim 1.

8. An electromechanical transducer, comprising:
   a stator assembly; and
   a rotor arrangement as set forth in claim 7.

9. The electromechanical transducer as set forth in claim 7, wherein the electromechanical transducer is a generator.

10. A wind turbine, comprising:
    a tower;
    a rotor, which is arranged at a top portion of the tower and which comprises a blade; and
    an electromechanical transducer, comprising:
    a stator assembly; and
    a rotor arrangement as set forth in claim 7.

* * * * *